April 24, 1951      E. ENGELMAN      2,549,782
VOLTAGE REGULATOR
Filed Aug. 6, 1945
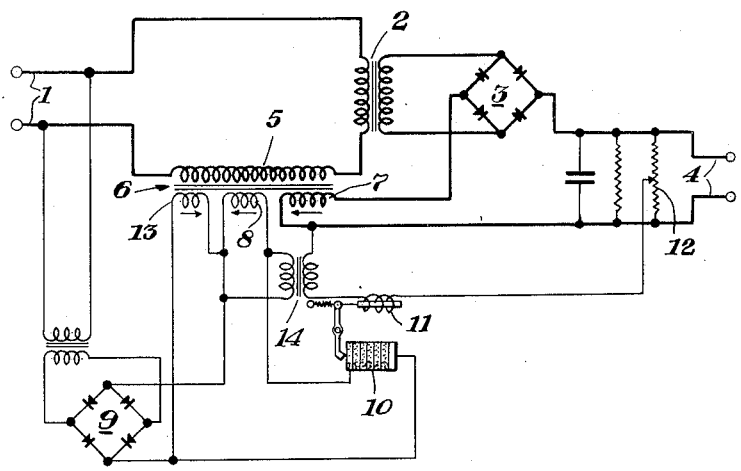
INVENTOR.
EDMUND ENGELMAN
BY
ATTORNEY Patented Apr. 24, 1951

2,549,782

UNITED STATES PATENT OFFICE 2,549,782

VOLTAGE REGULATOR

Edmund Engelman, Elmhurst, N. Y., assignor to Federal Telephone and Radio Corporation, New York, N. Y., a corporation of Delaware Application August 6, 1945, Serial No. 609,215

3 Claims. (Cl. 323—66)

My invention relates to voltage regulators, particularly to regulators for alternating current rectifiers of the type used, for example, for charging storage batteries.

The general object of my invention is an improved alternating current rectifier so regulated as to provide a substantially constant voltage at the direct current output terminals over a wide range of current loads.

Another object of my invention is a rectifier so regulated as to provide a substantially constant output voltage over a wide range of input voltages.

Still another object of my invention is a regulated rectifier which consumes little power at no load and accordingly has a high over-all efficiency.

These and other objects of my invention will become manifest as the following description of one embodiment thereof proceeds. The single figure of the accompanying drawing shows diagrammatically the circuits of the one embodiment.

Referring to the drawing, the alternating current source 1 is coupled through a transformer 2 to a full wave rectifier 3, and thence to the load or output terminals 4. The rectifier 3, hereinafter referred to as the primary rectifier, may be of the motor-generator type or of the static type shown in which four unidirectional branches, of say copper oxide or selenium discs, are connected in a four-sided bridge with the A.-C. input across one diagonal and the D.-C. output across the other diagonal. In series with the A.-C. source, and on either side of the transformer 2, is connected the main current winding 5 of a saturable core reactor 6. According to my invention the saturation of the core and hence the inductive impedance of winding 5 is so controlled throughout the entire range of direct current loads and A.-C. voltage variations that the output voltage remains substantially constant.

To this end all of the direct load current is passed through a first direct current winding 7 on the reactor core which will, at the same time act as a filter choke. The number of turns of winding 7 is chosen so that, for full load, the ampere-turn value of the winding is just short of sufficient to saturate the core. The additional magnetizing energy necessary to complete the saturation of the core for full load is supplied by a second direct current winding 8, the magnetic polarity of windings 8 being the same as that of winding 7. The direct current for winding 8 is obtained from the auxiliary rectifier 9 coupled across the A.-C. input. So that the magnetizing effect of winding 8 may rise or fall with an increase or decrease in output voltage, a variable resistance, conveniently a carbon pile 10, is connected in series with the winding 8. The output D.-C. voltage, by means of an electromagnet 11 connected across the output, influences the pressure on the carbon pile and therefore its resistance and the current through the carbon pile is approximately proportional to the pressure on the pile. The degree of feedback control may easily be adjusted by potentiometer 12. In operation at heavy or full load, the principal magnetizing energy is supplied by the load current through winding 7, leaving winding 8 and the auxiliary rectifier 9 to supply only a relatively small amount of the energy for complete and sensitive voltage control. Hence the component parts not connected in the supply or load circuits and particularly the carbon pile may be small, of low capacity, and inexpensive.

According to a further and important feature of my invention, voltage regulation is also complete and efficient in the lower range of loads. A third direct current winding 13 on the reactor core is polarized to oppose the magnetizing effect of the first and second direct current windings 7 and 8, the number of turns of third winding 13 being so chosen that its ampere turns are substantially equal to the ampere-turns of the first winding 7 when the load is zero. Current through the first winding 7 even with no load connected to the output terminals 4 may be as much as 10 percent of full load because of bleeding resistors, potentiometers, and other auxiliary circuits connected across but not included in the D.-C. work circuit of the rectifier. For high values of direct current through the first winding 7, energization of electromagnet 11 is relatively high, and the pressure on the carbon pile is low, the resistance of the carbon pile is high and the current through the carbon pile and the second direct current winding 8 is low. It follows that since the second direct current winding 8 draws little current from rectifier 9, the full output voltage of the rectifier 9 is maintained and is impressed on the third direct current winding 13. This full output voltage supplies the necessary current to this third direct current winding 13 to neutralize the magnetizing effect of the said first direct current winding 7 as above mentioned.

The voltage regulation of rectifier 9 is purposely made poor, as by designing its capacity small and/or adding resistance in its diagonals or in its arms, so as to produce a considerable difference between no load and full load D.-C. voltage across rectifier 9. Herein lies an important feature of my invention. For no load, the voltage across and the current through the third direct current winding 13 is at a maximum, to neutralize the first direct current winding 7, yet at full load, the voltage across said third winding 13 is at a minimum and its neutralizing power is at a minimum. That is, the power output of rectifier 9 automatically shifts between the second and third direct current windings 8 and 13 in response to the load demand at the output 4, and unlike previous regulators of this type, the magnetization of the reactor core is efficiently reduced to zero or increased to saturation to produce a full range of reactor impedance values.

The regulator, in attempting to maintain constant output voltage, tends to permit an increase in the current flow beyond that which would be required to bring the output voltage to normal. When the current in the second direct current winding 8 finally reaches the desired value the resistance of the resistor 10 has become too low and the current in the winding 8 continues to increase. This results in hunting of the regulating mechanism. To avoid this hunting, the transformer 14 is employed with its primary connected in series with the electromagnet 11 and its secondary connected across the said second winding 8. When the decrease in current through the electromagnet 11 takes place there is a change in current in the primary of the transformer 14. This induces a voltage in the secondary of this transformer which in turn causes a momentary flow of current in the said second winding 8 in the proper direction to speed up the regulating action of the current flowing coil 13. Of course, the polarities of the induced voltages across the secondary of the transformer 14 must be such as to cause the current to flow through the said second winding 8 in the required direction so as to augment the regulatory of the current in the third winding 13. The ratio of turns between the primary and secondary windings of the transformer 14 or the coupling therebetween may be adjusted to produce the desired amount of current flow.

My improved voltage regulator produces a substantially constant output voltage over a wide range of current loads, has a high over-all efficiency, and is simple and inexpensive in construction.

While I have disclosed the principles of my invention in connection with one embodiment, it will be understood that this embodiment is given by way of example only and not as limiting the scope of the invention as set forth in the objects and the appended claims.

I claim:

1. A voltage-regulated power supply system that comprises a reactor including a saturable core and a plurality of windings including an alternating current winding and a first, a second and a third direct current winding, said first direct current winding being connected to a load, the magnetic polarity of said first direct current winding being the same as the magnetic polarity of said second direct current winding and opposed to the magnetic polarity of said third direct current winding, a variable resistance connected in circuit with said second direct current winding, said second direct current winding and resistance being connected in parallel with said third direct current winding, and means responsive to the load voltage for varying the resistance of the variable resistance whereby the current in the second direct current winding is changed and the saturation of the saturable core is altered.

2. A voltage-regulated power supply system that comprises a reactor including a saturable core and a plurality of windings including an alternating current winding and a first, a second and a third direct current winding, said first direct current winding being connected to load, the magnetic polarity of said first direct current winding being the same as the magnetic polarity of the second direct current winding and opposed to the magnetic polarity of said third direct current winding, a variable resistance connected in circuit with said second direct current winding, said second direct current winding and resistance being connected in parallel with said third direct current winding, and means responsive to the load voltage for varying the variable resistance whereby the current in the second direct current winding is changed and the saturation of the saturable core is altered, and anti-hunting means responsive to the load voltage and connected to said second direct current winding.

3. An electric power supply system that comprises: unregulated alternating current supply lines; a coupling transformer having its primary winding connected across said lines; a primary rectifier connected across the secondary of said coupling transformer and to a direct current load, the voltage of which is to be regulated; a saturable core, reactor having a main alternating current winding connected in series with the primary winding of said transformer and having three direct current windings, the third being of opposite magnetic polarity relative to the common polarity of the first and second windings, the first of said windings being connected in series with the direct current load whereby the current in said winding fluctuated with changes in said load; a secondary rectifier connected across the alternating current supply lines and to the third winding whereby the current in the winding is subject to change in accordance with fluctuations in the supply lines; a variable resistor connected in series with said second winding to the secondary rectifier; and means for changing the resistance of said resistor in accordance with changes in the direct current load voltage whereby the current in the second winding and the saturation of the core is controlled.

EDMUND ENGELMAN.

REFERENCES CITED

The following references are of record in the file of this patent:

UNITED STATES PATENTS

| Number | Name | Date |
|---|---|---|
| 1,710,755 | West | Apr. 30, 1929 |
| 2,066,919 | West | Jan. 5, 1937 |
| 2,084,870 | Schmidt | June 22, 1937 |
| 2,114,827 | Aggers | Apr. 19, 1938 |
| 2,346,997 | Priest | Apr. 18, 1944 |